United States Patent [19]
Davis

[11] 3,782,613
[45] Jan. 1, 1974

[54] FISHING ROD HOLDER

[76] Inventor: Marvin A. Davis, 66 Ocean View, Apt. 33, Santa Barbara, Calif. 93103

[22] Filed: Apr. 19, 1972

[21] Appl. No.: 245,544

[52] U.S. Cl. ............................................. 224/5 E
[51] Int. Cl. ............................................. A45f 5/00
[58] Field of Search ............... 224/5 E, 1 R, 26 R, 224/26 B

[56] References Cited
UNITED STATES PATENTS

| | | | |
|---|---|---|---|
| 2,735,596 | 2/1956 | Smedley et al. | 224/5 E |
| 2,719,659 | 10/1955 | Bowman | 224/5 E |
| 2,314,747 | 3/1943 | White | 224/5 E UX |
| 3,115,997 | 12/1963 | Hengst | 224/5 E |
| 3,342,387 | 9/1967 | Ryan | 224/5 R |

Primary Examiner—Gerald M. Forlenza
Assistant Examiner—Jerold M. Forsberg
Attorney—William W. Haefliger et al.

[57] ABSTRACT

A fishing rod holder comprises:

a. an integral base pad and cup consisting of molded elastomeric material, the cup projecting at one side of the base pad and sized to receive the handle end of a fishing rod, b. the base pad containing an internal slot located inwardly of the cup and spaced therefrom, the slot extending transversely of the cup to receive a fisherman's belt for securing the base pad to the fisherman.

1 Claim, 3 Drawing Figures

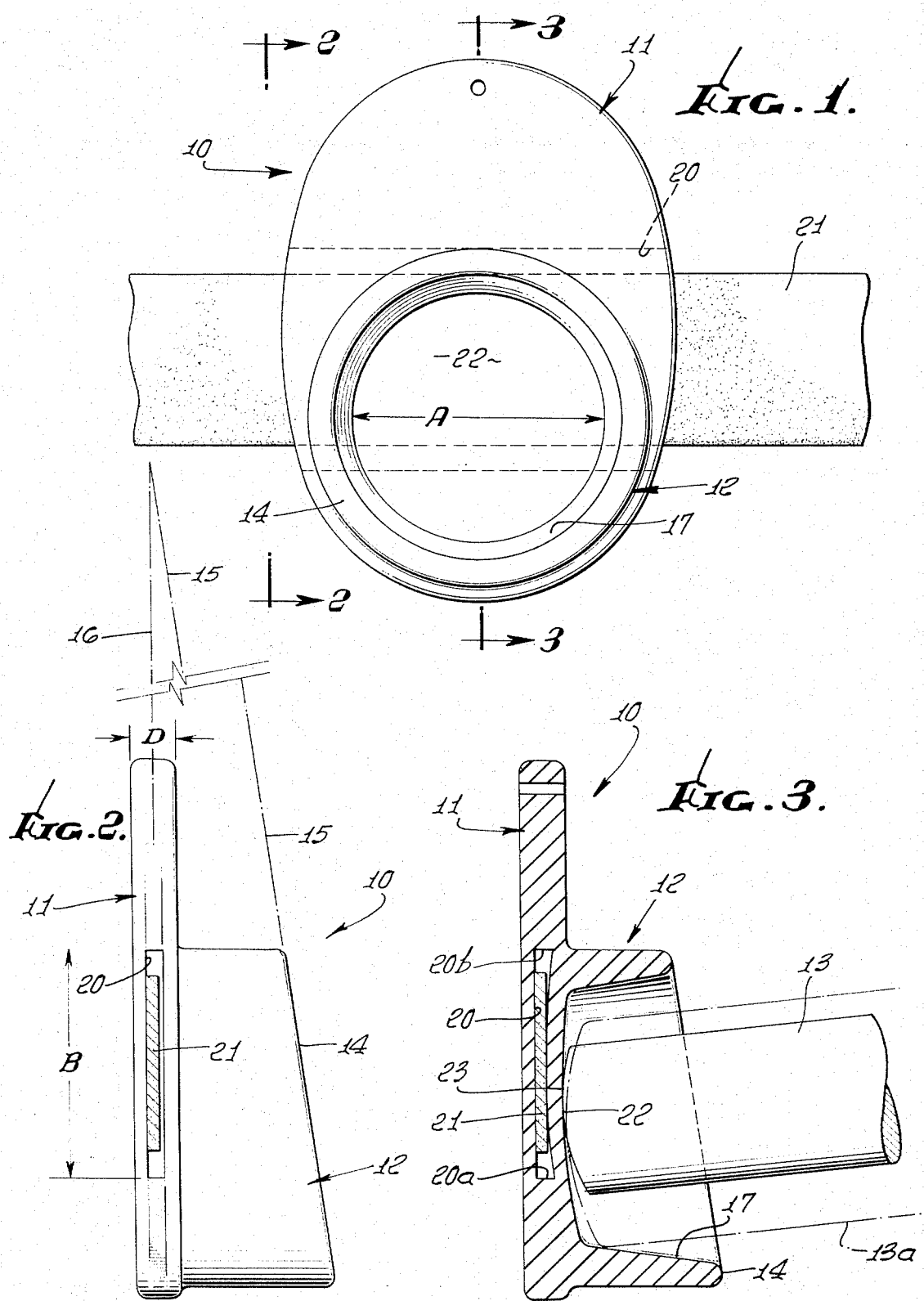

FISHING ROD HOLDER

BACKGROUND OF THE INVENTION

This invention relates generally to fishing equipment, and more particularly concerns fishing rod holders.

In the past, rod holders have been less than satisfactory due to relatively high cost and inadequate construction. As to the latter, rivets typically used in leather holders tend to rust rapidly in marine environments, and the leather rots. There is accordingly a need for a simple, low cost, relatively small, easily mounted rod holder of durable construction.

SUMMARY OF THE INVENTION

It is a major object of the invention to provide a rod holder overcoming the above disadvantages, and also offering the additional advantages as will appear.

Basically, the improved rod holder comprises an integral base pad and cup consisting of one-piece, molded elastomeric material for durability, the cup projecting at one side of the pad and sized to receive the handle end of a rod; and a slot in the base located inwardly of the cup to receive a fisherman's belt for securing the pad and cup to the fisherman. As will appear, tapering of the cup rim and internal conical wall aid materially in rapid location of the rod end in the cup as required during playing and landing of a large fish, as in deep sea fishing.

A further object and advantage is the provision of a cup interior wall of reduced thickness to be inwardly deflected by the rod end, tilted upwardly, to thereby effect clamping of a belt in the slot in response to inwardly transmitted rod end pressure, preventing slippage of the pad and cup on the belt.

These and other objects and advantages of the invention, as well as the details of an illustrative embodiment, will be more fully understood from the following description and drawings, in which:

DRAWING DESCRIPTION

FIG. 1 is a front elevation;
FIG. 2 is an end elevation on lines 2—2 of FIG. 1; and
FIG. 3 is a vertical section taken on lines 3—3 of FIG. 1.

DETAILED DESCRIPTION

As seen in the drawings, the rod holder 10 comprises an integral base pad 11 and cup 12 consisting of molded elastomeric material such as Neoprene, for example. The cup projects at the front side of the base pad and is sized to receive the handle end 13 of a fishing rod as better seen in FIG. 3. The cup 12 has an annular rounded rim 14 which may advantageously define a flat plane 15 tapering upwardly and toward an upward extension of a vertical plane 16 defined by pad 11. Also, the cup defines an inner conical surface 17 tapering toward the pad, such taper and the taper of plane 15 serving to facilitate easily and rapid entry of the rod handle end 13 into the cup for support, when a fish has been caught, as during deep sea fishing. Broken lines 13a indicate a larger handle end supported in the cup.

The base pad 11 contains a narrow internal slot 20 located inwardly or rearwardly of the cup 12 and spaced therefrom, the slot extending transversely of the cup, and horizontally, to receive a fisherman's belt 21, thereby to secure the pad to the fisherman. The slot also extends in the vertical plane 16 defined by the pad, as shown.

It will be noted that the interior wall 22 of the cup is of sufficiently reduced thickness in relation to the overall thickness D of the pad 11 as to be inwardly deflectible to frictionally clamp the belt in the slot in response to pressure exerted inwardly by the rod end upper extent 23, the rod being tilted slightly upwardly. Accordingly, the pad cannot then slip on the belt which may be quite smooth, and the rod end is securely anchored in position.

The minimum internal diameter A of the cup is typically between about 2–3 inches, and the slot vertical dimension B is typically between about 1½– 2½ inches. The lower edge 20a of the slot lies inwardly of the lower interior of the cup 12, and the upper edge 20b lies inwardly of the uppermost extent of the cup 12, as seen, whereby the belt major vertical extent lies rearwardly of the fishing rod handle end.

I claim:

1. In combination with a fishing rod, a holder, comprising
   a. an integral one-piece base pad and cup consisting of molded elastomeric material, the cup projecting at the front side of the base pad and sized to receive the handle end of a fishing rod,
   b. the base pad containing an internal slot extending in a vertical plane defined by the pad and located inwardly of the cup and spaced therefrom, the slot extending transversely of the cup to receive a fisherman's belt for securing the base pad to the fisherman, the pad having a flat rear face rearwardly of the cup, and the slot being everywhere spaced forwardly of said rear face, the cup defining an inner conical surface which tapers toward the pad and merges into a bottom wall at least the upper half of said conical surface being located forwardly of the slot and above the lowermost portion thereof, the cup having a substantially endless rim defining a plane tapering upwardly and toward an upward extension of a vertical plane defined by the pad, said bottom wall of the cup being substantially vertical and of sufficiently reduced thickness in relation to the overall thickness of the base pad as to be inwardly deflected to frictionally clamp the belt in said slot in response to inwardly exerted rod end pressure.

* * * * *